(No Model.)
C. S. BRADLEY.
LIGHTNING ARRESTER.
No. 589,557.  Patented Sept. 7, 1897.
*Fig 1.*
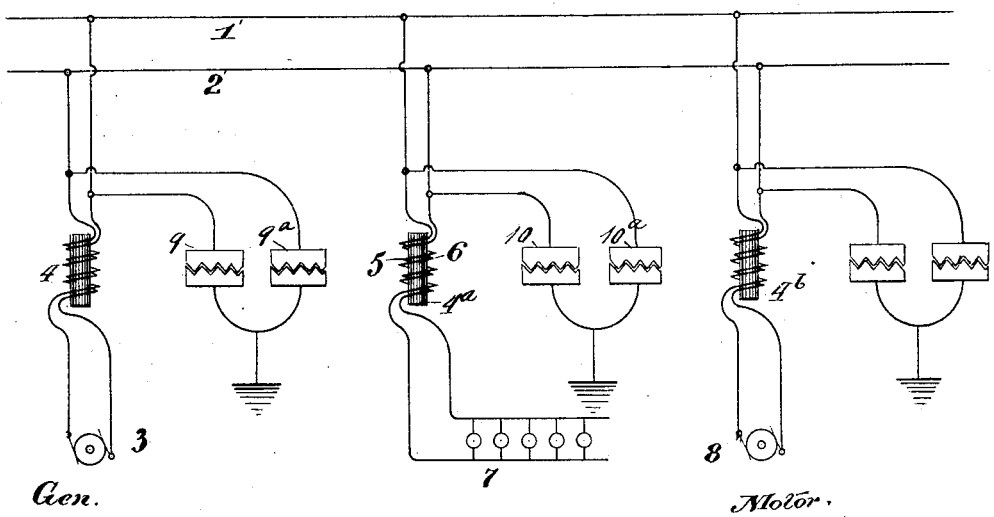
*Gen.*  *Motor.*
*Fig 2.*
WITNESSES:
C. W. Benjamin
George A. Adams.
INVENTOR
Charles S. Bradley
BY
his ATTORNEY

UNITED STATES PATENT OFFICE.

CHARLES S. BRADLEY, OF AVON, NEW YORK, ASSIGNOR TO THE GENERAL ELECTRIC COMPANY, OF NEW YORK.

LIGHTNING-ARRESTER.

SPECIFICATION forming part of Letters Patent No. 589,557, dated September 7, 1897.

Application filed May 28, 1895. Renewed February 9, 1897. Serial No. 622,702. (No model.)

*To all whom it may concern:*

Be it known that I, CHARLES S. BRADLEY, a citizen of the United States, residing at Avon, in the county of Livingston and State of New York, have invented certain new and useful Improvements in Lightning-Arresters, of which the following is a specification.

This invention relates to that type of lightning-arresters which depend for their effectiveness upon an inductive opposition to a lightning-discharge over a path, including translating devices by which said discharge is caused to take another path in which no translating devices are included.

My invention is especially applicable to circuits carrying alternating currents, although it may be employed also with advantage in connection with direct-current circuits.

In carrying out my invention I place the two sides of the circuit in mutual inductive relation, so that the two inductive effects normally counterbalance each other, no counter electromotive force to the flow of current being offered. This result may be conveniently effected by inclosing within a transversely-laminated tube two conductors, one carrying the outgoing current and the other the return current, or by placing two superposed windings on a laminated core, said windings being connected, respectively, to the outgoing and return sides of the circuit, so as to oppose one another in core magnetization. At the side or sides of the inductive device I preferably place an ordinary lightning-arrester, consisting of two serrated conducting-plates separated by a short air-gap and connected in a branch from the line-wires to the earth. As thus organized the dynamo-current creates no counter electromotive force, but the lightning-discharge, by similarly polarizing both inductive conductors, sets up a counter electromotive force and is shunted to earth over the spark-gaps or other points of leakage.

The several features of novelty of the invention will be more particularly hereinafter described, and will be definitely indicated in the claims appended to this specification.

In the accompanying drawings, which illustrate the invention, Figure 1 is a diagram of a circuit equipped with my improved lightning arresters or protectors. Fig. 2 is a sectional view of an arrester of a modified form of construction.

1 2 are two main or line wires of a circuit, and 3 a dynamo-electric machine for supplying current thereto.

4 $4^a$ $4^b$ are magnetic cores, laminated when alternating currents are employed. On each core are two coils of wire having the same number of turns 5 6, one connected in circuit with one wire, as 1, and the other with 2. The two coils are connected in circuit, so that they will oppose one another in a tendency to magnetize the core.

7 and 8 represent electric translating devices, 8 being a motor which it is desired to protect from damage by lightning. This may be effected by placing inductive-protectors 4 $4^a$ adjacent to the motor and by connecting in earth branches from the supply-wires ordinary saw-tooth lightning-arresters 9 10 $9^a$ $10^a$. With this organization the dynamo-currents, whether direct or alternating, will experience no counter electromotive force, since the two coils tend to develop opposite poles in the core, and therefore neutralize one another. The coils should be superimposed on one another or be wound as a duplex conductor, so that there will be no opportunity for the development of consequent magnetic poles. A simple and effective combination is shown in Fig. 2, comprising two straight conductors insulated from one another and preferably contained one within the other, the whole being inclosed in a shell of laminated iron.

11 $11^a$ are the conductors, and 12 the laminated iron shell. Such an organization a few feet in length and placed on the circuit adjacent to the translating device will prove effective in protecting the same.

The device will prove more or less effective without the iron core or shell, the magnetic circuit being in such a case formed in the air. Iron, however, increases the inductive effect and permits a smaller compass for the apparatus.

Having thus described my invention, what I claim as new, and desire to secure by Letters Patent, is—

1. A lightning-arrester comprising two conductors in mutual inductive relation having two terminals connected to line and two to a translating device, said conductors being associated to oppose one another in magnetizing effect under the working current passing to the translating device, thereby permitting such current to pass freely, but assisting one another in magnetizing effect when the line is charged by a lightning-stroke.

2. A lightning-arrester comprising two conductors in mutual inductive relation having two terminals connected to line and two to a translating device, said conductors being associated to oppose one another in magnetizing effect under the working current passing to the translating device, thereby permitting such current to pass freely, but assisting one another in magnetizing effect when the line is charged by a lightning-stroke, and a ground connection of high resistance but low impedance at or near the lightning-arrester.

3. A lightning-arrester comprising two conductors in mutual inductive relation, a translating device between said conductors, the conductors being wound or associated to oppose each other under line-current, and a branch connection of high resistance and low inductance to earth from the line side of the conductors.

4. The combination with a pair of lines connected to one or more translating devices, of a lightning-arrester interposed therein comprising two conductors surrounded by a magnetic core and connected with the lines to neutralize one another in magnetizing effect under current traversing them in opposition, but impeding the passage of lightning-discharges entering from the lines.

5. As a means of grounding lightning-discharges, an inductive device comprising two conductors connected with the outgoing and return wires of a circuit so as to oppose one another in inductive effect, under current from the generator but assist one another with grounded currents, and a branch connection to earth including a spark-gap on the line side of the inductive device.

In testimony whereof I have hereunto subscribed my name this 21st day of May, A. D. 1895.

CHARLES S. BRADLEY.

Witnesses:
GEORGE A. ADAMS,
RORT. H. READ.